United States Patent [19]
Pennino

[11] Patent Number: 5,497,872
[45] Date of Patent: Mar. 12, 1996

[54] METHOD AND APPARATUS FOR CLEANING CONVEYOR BELTS

[75] Inventor: Frank Pennino, Farmingdale, N.Y.

[73] Assignee: Pari Industries, Jamaica, N.Y.

[21] Appl. No.: 269,884

[22] Filed: Jul. 1, 1994

[51] Int. Cl.[6] .................................................. B65G 45/14
[52] U.S. Cl. .................................... 198/498; 198/496
[58] Field of Search .................................. 198/496, 498, 198/494; 15/256.52

[56] References Cited

U.S. PATENT DOCUMENTS 3,161,285  12/1964  Hummer et al. ..................... 198/498
3,212,631  10/1965  Thompson ........................ 198/498 X
3,430,758   3/1969  Searles ........................... 198/498
4,073,376   2/1978  Kross ........................... 198/496 X
5,161,666  11/1992  Pope ............................ 198/496 X

FOREIGN PATENT DOCUMENTS 0897087   4/1972  Canada ............................... 198/498
0275834   5/1971  U.S.S.R. ............................. 198/498
1268489  11/1986  U.S.S.R. ............................. 198/496

Primary Examiner—James R. Bidwell

[57] ABSTRACT

A conveyor belt is cleaned of debris left by conveyed materials, by a high-speed spiral-ribbed roller; contacting portions of the belt and the cleaning roller are of polymeric material, in particular polyurethane. The speed of the ribs is vastly greater than that of the belt.

14 Claims, 1 Drawing Sheet

METHOD AND APPARATUS FOR CLEANING CONVEYOR BELTS

The present invention relates to belt conveyors and, more particularly, to belt conveyors equipped with cleaners for the belts.

BACKGROUND

Conveyor belts formed as loops for transporting materials along a forward stretch of the loop often require cleaning along the return stretch of the loop. For that purpose, various devices such as scrapers and brushes have been used, with varied degrees of success.

Industrial belt conveyors, which are used to convey coal, gravel and other particulate material, require cleaning of the return stretch of the loop, to rid the belt of embedded or stuck-on particles. A particularly effective cleaner for belts of that kind relies on a ribbed cleaning roller, usually of polymeric material such as polyurethane. The ribs of the roller just "kiss" the belt and sweep over the belt at high speed to strip the particles from the belt. Characteristically, such belts are quite thick and very stiff. If any significant amount of pressure of the cleaning roller were to develop against the conveyor belt, various troubles may arise. The cleaning roller smokes, and the drives of the roller and the belt conveyor are overloaded and damaged, or the drive is shut down by protective gear.

SUMMARY OF THE INVENTION

Endless-loop conveyor belts are commonly used for food products such as chocolate. For practical reasons, cleaning of belt conveyors for food should be particularly proficient. The present invention in part arises from the discovery that the combination of a supple conveyor belt tensioned around a small arc or "wrap angle" against a ribbed cleaning roller, operated at high speed; yields remarkably effective performance as a belt cleaner. Residue that may be stuck to the conveyor belt is stripped away; the ribbed roller flings away the stripped material so that the roller, in a sense, is self-cleaning.

The foregoing cleaning configuration is not only proficient for its primary function of keeping the belt clean; it can also be highly durable. A belt of polyurethane, having fabric reinforcement, combined with a ribbed cleaning roller of polyurethane configured and operated, as described above, has been in operation under factory conditions for almost a year. This is remarkable, taking into consideration the high speed of the cleaning ribs sweeping against the surface of the conveyor belt. Other suitable materials may be substituted for polyurethane; however, as a conveyor belt for food products, polyurethane has the further advantage of meeting standards of the Food and Drug Administration for use with food products.

Both method and apparatus aspects of the invention are involved, as will be apparent from the detailed description that follows, referring to the accompanying drawings.

Figure 1:
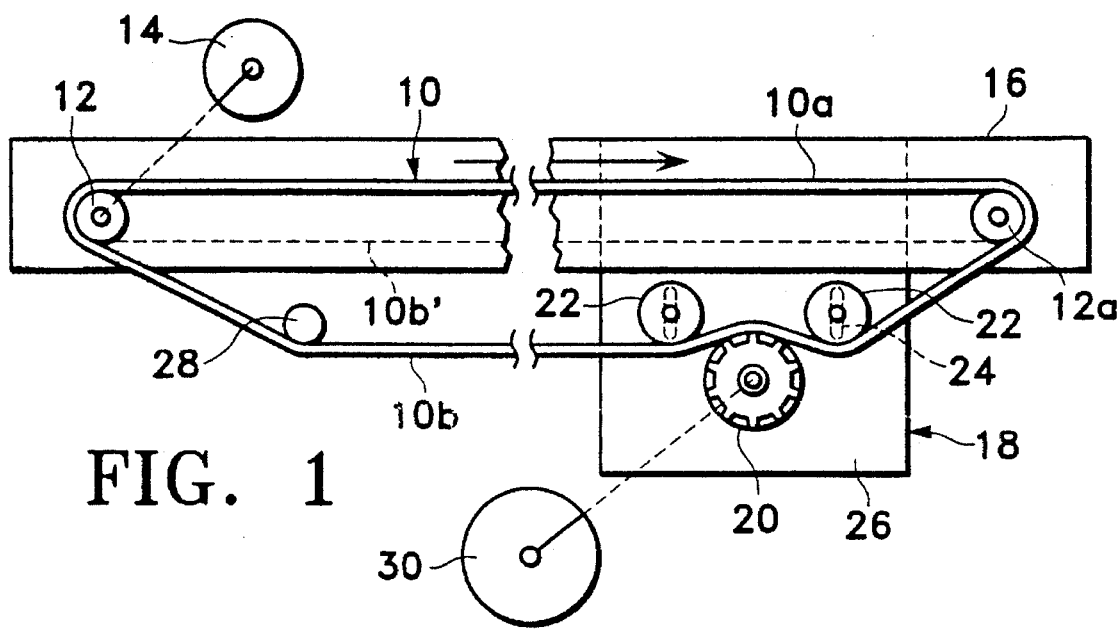
FIG. 1 is a somewhat diagrammatic view, not to scale, of an illustrative embodiment of the apparatus aspect of the invention, front mounting structure being omitted to reveal the operative components.

Referring to the drawings, an endless belt 10 extends around head pulleys or rollers 12 and 12a. In the form shown, pulley 12a is an idler, and head pulley 12 has a suitable driver such as motor 14. Head pulleys 12 and 12a and motor 14 are supported by conveyor frame 16 (the front member of the conveyor frame being omitted from this Figure).

Belt 10 forms a loop around the head pulleys; the looped belt is tensioned in any customary manner, as by an adjustable or self-adjusting mounting for head pulley 12a. Upper flight 10a of the conveyor belt carries articles of food such as chocolate to the right, as indicated by the arrow. The path 10b' of a return flight of belt 10 below flight 10a would be formed by the conveyor belt when looped only around the head pulleys and tensioned between the head pulleys 12 and 12a. The actual return flight 10b is deflected away from path 10b' by a belt-cleaning assembly 18. This assembly includes a cleaning roller 20 and a pair of "wrap" control idler rollers 22, driven by the belt. Wrap control rollers 22 in FIG. 1 have shafts that are adjustable along slots 24 formed in end plates 26. Rollers 22 are fixed in a desired adjustment by any suitable means (not shown) familiar to those skilled in the art of conveyors. An idler 28 contributes to the stability of the path of belt 10.

Figure 3:
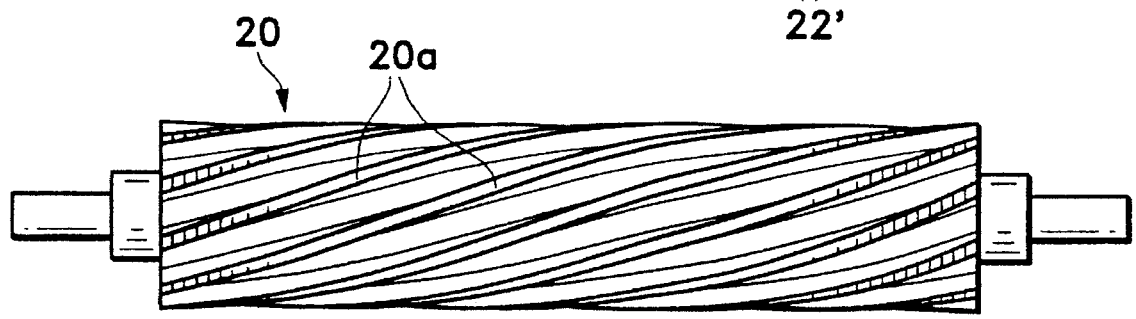
FIG. 3 is a side view of a cleaning roller forming part of the apparatus of FIG. 1.
Figure 4:
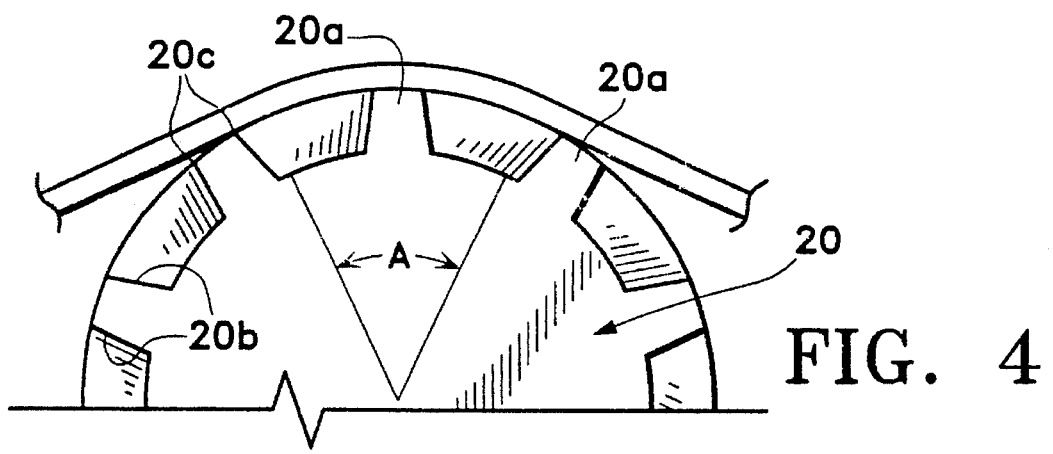
FIG. 4 is an enlarged fragmentary end view of the roller in FIGS. 1 and 3 engaged by the conveyor belt.

A cleaning roller 20 (FIGS. 1, 3 and 4) has raised ribs whose outer surfaces lie in an imaginary cylindrical surface. Side surfaces 20b of each rib intersect the outer surface of each rib, forming edges 20c.

Some form of driver, such as motor 30 or a motor and an interposed gear box (not shown) drives cleaning roller 20. The cleaning roller is moved so fast that the surface speed of the cleaning ribs is vastly higher than the surface speed of the belt. Both directions of rotation of the cleaning roller in relation to the travel direction of the belt are effective for the purposes of the invention.

The "wrap angle" A of the conveyor belt subtends or "wraps" around a small angle of the roller e.g., 20° to 45°. The spiral ribs of the roller deflect the belt from what otherwise would be a straight path of the taut belt. This angle extends from the point at which the belt becomes tangent to a rib or ribs on the roller to the point where the belt is tangent to the roller and separates from the roller. Between those limits, the belt is continuously in contact with multiple ribs at various points along their spiral lengths. The belt applies sustained pressure against the roller, and the roller provides continuous substantially uniform support for the belt. The belt is thin and supple enough to perform in the described manner.

In a practical and highly successful example, the head pulleys 12 and 12a were ⅝-inch in diameter; belt 10 was ¹⁄₃₂-inch thick; and cleaning roller 20 was 4¼ inch in diameter. The belt speed was in the range of 40 to 80 feet per minute, versus 800 R.P.M. of the cleaning roller, equivalent to 890 feet per minute of the ribs where they contact the belt. The surface speed of the ribs is far in excess of the surface speed of the conveyor belt, a ratio of ten-to-one being quite suitable. In the example, roller 20 is of polyurethane and the belt is polyurethane reinforced by fabric. The ribs on the 4¼ inch roller in this example are ½-inch high having an edge face ¼-inch wide by ½-inch high.

The described apparatus is useful for cleaning the return flight 10b of the belt proficiently, removing a residue left by conveying a wide range of products, including chocolate and other sugary products, and wet and sticky material, and many other products. The described cleaning roller and the belt have proved highly durable, without wearing out for nearly a year of continuous use under factory conditions.

Figure 2:
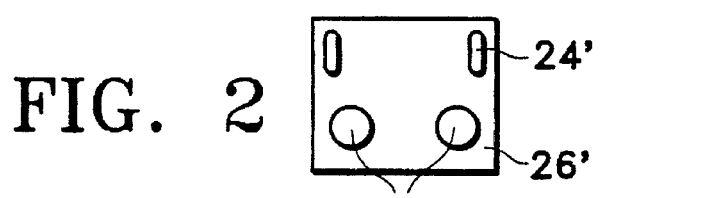
FIG. 2 is a side view of a modified subassembly useful in the apparatus of FIG. 1, the front mounting plate of the subassembly being omitted.

The wrap-control rollers 22' (FIG. 2) are advantageously supported for adjustment in unison, toward and away from the cleaning roller. A pair of end plates 26' support rollers 22' at respective ends (only one plate 26' being shown). Slots 24' in plate 26' accommodate adjustment of both rollers 22' in unison relative to the conveyor frame structure. Bolts extending through slots 24' fasten each end plate 26' to the conveyor frame structure.

In operation, articles as of chocolate are transported toward the right by flight 10a of the conveyor belt. The return flight 10b of the belt, bearing residue, is stripped clean by cleaning roller 20; the stripped residue is thrown or projected by the cleaning roller from the belt and into a collecting receptacle (not shown).

It is evident that the apparatus in the drawings described above is exemplary yet it is illustrative. Therefore, a-range of modifications and substitutions will be apparent to those skilled in the art. Consequently, the invention should be construed broadly in accordance with its true spirit and scope.

What is claimed is:

1. Conveyor apparatus having a pair of conveyor-supporting rollers remote from each other, an endless-loop conveyor belt tensioned about said rollers and providing a material-conveying stretch and a return stretch of the belt between said belt-supporting rollers, means for operating said belt at a prescribed surface speed, a cleaning roller having ribs whose edges lie in an imaginary cylinder, said apparatus including a pair of spaced-apart idlers for holding a tensioned portion of said return stretch of the belt against the cleaning roller so as to form a wrap angle of approximately 20° to 45° around the cleaning roller, and means for driving said cleaning roller so that its ribs sweep along said conveyor belt at a surface speed far in excess of the surface speed of said belt.

2. Conveyor apparatus as in claim 1, wherein said material-conveying stretch of the tensioned endless-loop belt extends along an essentially straight path between said conveyor-supporting rollers and wherein said return stretch of the conveyor belt is diverted by said cleaning roller and said spaced-apart idlers away from being parallel to said material-conveying stretch of the conveyor belt.

3. Conveyor apparatus as in claim 1, wherein said roller is polymeric and wherein said belt is fabric-reinforced polymeric material.

4. Conveyor apparatus as in claim 1, wherein said cleaning roller is of polyurethane and said belt is of polyurethane-bearing fabric.

5. Conveyor apparatus as in claim 1, wherein said ribs are portions of spirals that are relatively close to each other so that, despite the limited wrap angle of approximately 20°–45° of the belt on the cleaning roller, the belt applies sustained bearing pressure against said cleaning roller and is supported substantially uniformly thereby.

6. The method of stripping debris from the return flight of a conveyor belt, including the steps of driving a conveyor belt at a prescribed surface speed, and tensioning the conveyor belt against the ribs of a ribbed cleaning roller over a wrap angle of about 20° to 45° while driving the cleaning roller at a rate such as to develop a vastly higher speed of the ribs than said surface speed of the conveyor belt.

7. The method as in claim 6, wherein the mutually engaging portions of said conveyor belt and said cleaning roller are of polymeric material.

8. The method as in claim 6, wherein the mutually engaging portions of said conveyor belt and said ribbed cleaning roller are of polyurethane.

9. Conveyor apparatus having a pair of conveyor-supporting rollers remote from each other, a supple endless-loop conveyor belt tensioned about said rollers and providing a material-conveying stretch and a return stretch of the belt between said belt-supporting rollers, said belt being of the order of 1/32-inch thick and whose surface, at least, is of polyurethane, means for operating said belt at a prescribed surface speed, a cleaning roller including ribs having peripheral surfaces that lie in an imaginary cylinder, the ribs having lateral surfaces that intersect the peripheral surfaces of the ribs so as to form pairs of cleaning edges and the ribs being made of polyurethane, said apparatus including wrap-angle determining means for holding a tensioned portion of said return stretch of the belt against the ribs of the cleaning roller so as to form a wrap angle of approximately 20° to 45° around the cleaning roller, and means for driving said cleaning roller so that its ribs sweep along said conveyor belt at a surface speed of the order of ten times the surface speed of said belt.

10. Conveyor apparatus as in claim 9, wherein said material-conveying stretch of the tensioned endless-loop belt extends along an essentially straight path between said conveyor-supporting rollers and wherein said return stretch of the conveyor belt is diverted by said cleaning roller and said wrap-angle determining means away from being a straight taut return stretch of the conveyor belt.

11. Conveyor apparatus having a pair of conveyor-supporting rollers remote from each other, a supple endless-loop conveyor belt tensioned about said rollers and providing a material-conveying stretch and a return stretch of the belt between said belt-supporting rollers, means for operating said belt at a prescribed surface speed, a cleaning roller including ribs having peripheral surfaces lying in an imaginary cylinder, said apparatus including wrap-angle determining means for holding a tensioned portion of said return stretch of the belt against the ribs of the cleaning roller so as to bear against said ribs through a wrap angle of approximately 20° to 45° around the cleaning roller, and means for driving said cleaning roller so that its ribs sweep along said conveyor belt at a surface speed many times the surface speed of said belt, the materials that form the surface of said belt and the ribs being related to each other for long endurance despite the bearing and the high speed of the ribs against the surface of the belt.

12. Conveyor apparatus as in claim 11, wherein said material-conveying stretch of the tensioned endless-loop belt extends along an essentially straight path between said conveyor-supporting rollers and wherein said return stretch of the conveyor belt is diverted by said cleaning roller and said wrap-angle determining means away from a taut straight path tangent to the conveyor-supporting rollers.

13. Conveyor apparatus as in claim 11, wherein said roller is polymeric and wherein said belt is fabric-reinforced polymeric material.

14. Conveyor apparatus as in claim 11, wherein said cleaning roller is of polyurethane and said belt is of fabric-reinforced polyurethane.

\* \* \* \* \*